Oct. 17, 1961     E. MacCALLUM     3,004,643
CLIP
Filed Aug. 18, 1958     2 Sheets-Sheet 1
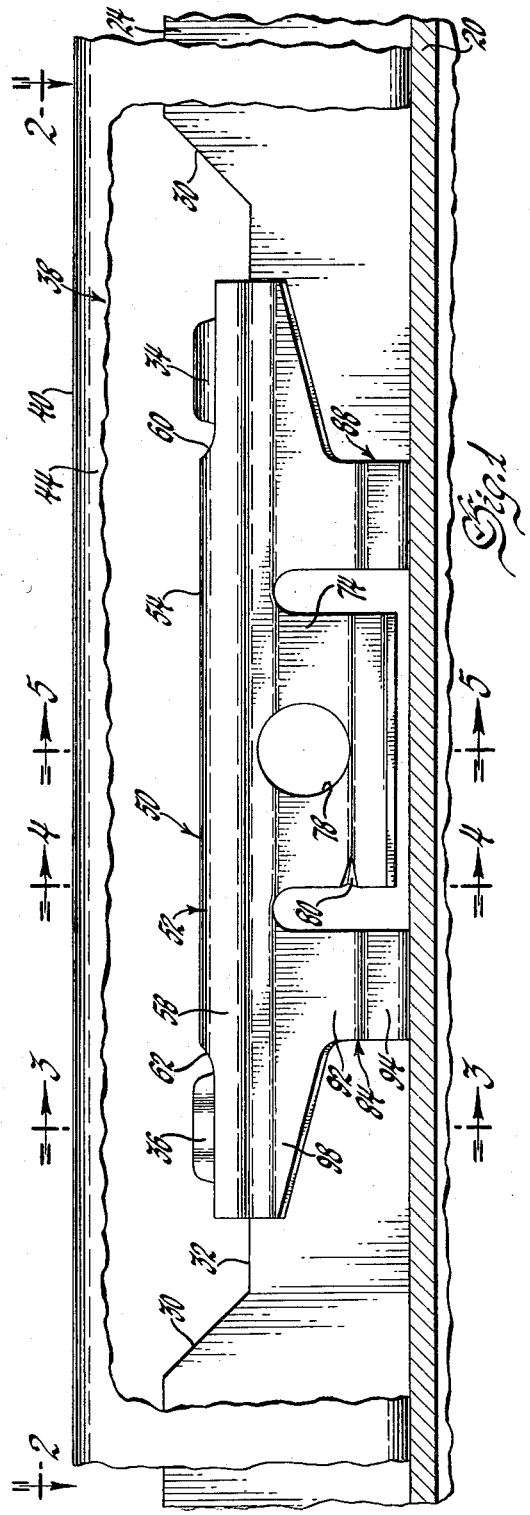
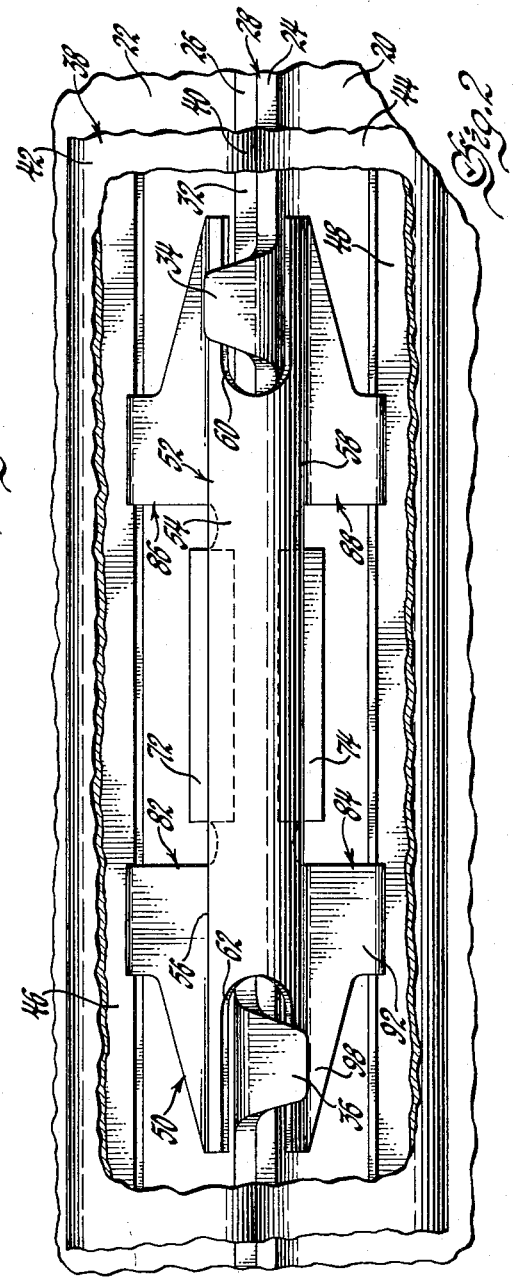
INVENTOR.
Edward MacCallum
BY
D. D. McGraw
ATTORNEY

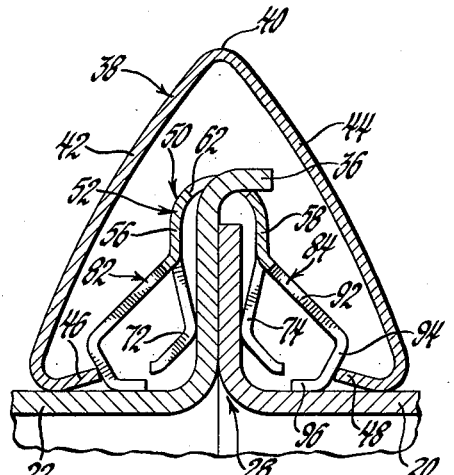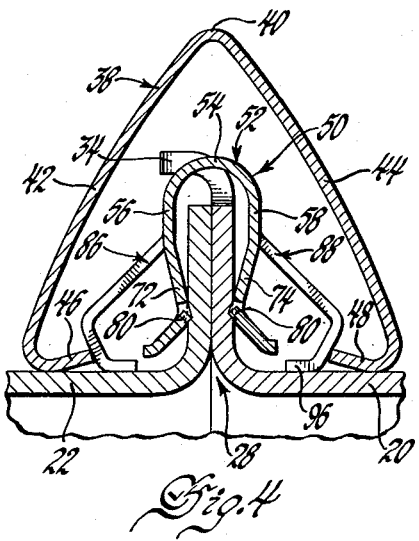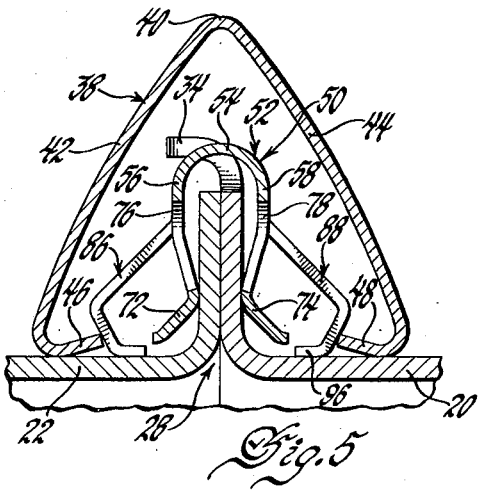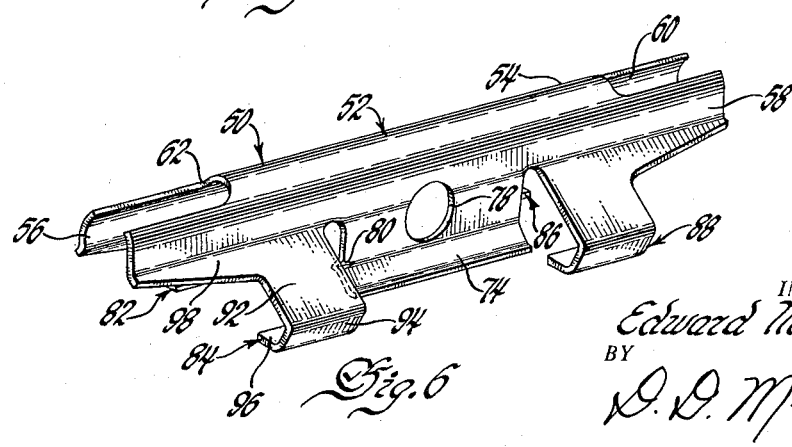

United States Patent Office 3,004,643
Patented Oct. 17, 1961

3,004,643
CLIP
Edward MacCallum, Grosse Pointe Woods, Mich., assignor to General Motors Corporation, Detroit, Mich., a corporation of Delaware
Filed Aug. 18, 1958, Ser. No. 755,586
5 Claims. (Cl. 189—88)

The invention relates to a clip for holding a molding in place on a panel section and more particularly to a clip which may be secured to a pinchweld joint over which the molding is to be placed. When two or more panels are joined together, any of several joining techniques may be utilized. A common type of joint is that formed by providing flanges on two adjacent panels which extend out of the planes of the panels and are substantially parallel so that they may be spot welded or otherwise secured together. This type of joint is commonly referred to as a pinchweld. When such joints are used on commercial products such as automobiles, the pinchweld may extend from the outer panel surfaces and present a ridge which it is desirable to cover by a molding of suitable formation. The molding may be used for decorative purposes as well as serving as a pinchweld cover.

The clip embodying the invention may be positively fastened to the pinchweld and will be retained within the hollow portion of the molding. It is preferable to provide the clip with attaching means by which it may be secured to the pinchweld rather than to either of the panels directly. This arrangement permits a panel construction to be utilized which will have no apertures extending through the panels to accommodate molding fasteners.

Clips embodying the invention may be initially secured to the pinchweld by one or more barbs which are integrally formed with the clips. The clips may then be permanently secured to the pinchweld by suitable means such as a bent tab extending over a portion of the clip, the tab being formed from part of the pinchweld. Such clips may also be provided with aligned apertures through which other suitable securing means such as a pin, bolt or screw may be inserted and attached to the pinchweld to hold the clip positively in place. The clip illustrated has independently adjustable molding engaging segments which may be adjusted within limits to various size molding strips without affecting the portions of the clip attaching the unit to the pinchweld.

In the drawings:

FIGURE 1 is an elevation view of a pinchweld and molding assembly using a clip embodying the invention and having parts broken away and in section.

FIGURE 2 is a view of the assembly taken in the direction of arrows 2—2 of FIGURE 1 and having parts broken away and in section.

FIGURE 3 is a cross section view of the assembly taken in the direction of arows 3—3 of FIGURE 1 and having parts broken away and in section.

FIGURE 4 is a view of the assembly taken in the direction of arrows 4—4 of FIGURE 1 and having parts broken away and in section.

FIGURE 5 is a view of the assembly taken in the direction of arrows 5—5 of FIGURE 1 and having parts broken away and in section.

FIGURE 6 is an isometric view of the clip shown in the assembly of FIGURE 1.

The assembly shown in the drawings includes panels 20 and 22 which are provided with vertical flanges 24 and 26. These flanges are in parallel relation when the panels are assembled and joined together by any suitable means such as spot welding the flanges. The welded flanges thus provide a pinchweld 28. The flanges 24 and 26 are undercut as indicated at 30 to provide notches 32 at spaced intervals along the pinchweld. Either or both of the flanges may be provided with upwardly extending tabs 34 and 36 formed within a notch 32. In this instance tab 34 is shown as being formed from flange 24 and tab 36 as being formed from flange 26. The tabs are originally formed to extend vertically upward and are bent over as illustrated in the drawings after the clip to be described is installed in place. A molding 38 in the form of a strip may be positioned over the pinchweld 28 in order to protect the pinchweld as well as to make the finel product, of which the panels 20 and 22 are a part, more attractive. The molding illustrated is generally triangular in cross section with the apex 40 positioned substantially in the plane of the pinchweld 28. The sides 42 and 44 of the molding extend downwardly and outwardly from the apex 40 and terminate with inwardly turned flanges 46 and 48, respectively, which preferably extend in slightly upward directions so that the molding 38 engages the panels 20 and 22 at curved sections.

The clip 50 is formed so that it receives the pinchweld 28 intermediate its sides and has portions engaging the molding flanges 46 and 48 to hold the molding in place. Clip 50 is preferably formed with a body 52 which extends longitudinally of the clip. This body may be formed in a generally channel-shaped cross section and is illustrated as having a curved channel-like cross section defined by a center section or arched portion 54 and side sections 56 and 58. These sections are integrally formed to provide the channel section of body 52.

Either end of the body may be undercut to provide forked apertures 60 and 62 which receive tabs 34 and 36 therein when the clip is placed over the pinchweld 28. The apertures 60 and 62 may extend slightly into the upper portions of the side sections 56 and 58 if necessary in order to permit proper installation of the clip.

A pair of flanges 72 and 74 may be integrally formed with the clip body sides 56 and 58 to extend downwardly and inwardly toward the vertically disposed longitudinal center plane of the clip body and then be bent or curved to extend downwardly and outwardly from that plane, as is best illustrated in FIGURES 3 through 5. These flanges are preferably positioned centrally of the clip.

Apertures 76 and 78 are respectively provided in flanges 72 and 74 and are substantially in alignment so that any suitable securing means such as a screw or bolt may be passed therethrough if desired. Thus, if the pinch weld tab 34 and 36 are broken off or otherwise unuseable, a hole may be drilled through the pinchweld 28 in alignment with apertures 76 and 78 and a suitable fastener such as a pin or bolt may be passed through the hole and the apertures to secure the clip in place on the pinchweld. Provision of a secondary securing means of this nature is especially desired when the molding 38 is being replaced in service since the tabs 34 and 36 are likely to be broken during the removal of the old molding and any clips requiring replacement.

Flanges 72 and 74 may each be provided with one or more barbs 80 which are struck from and positioned on the flanges so that they engage the outer surfaces of the pinchweld. The barbs permit the clip to be easily snapped onto the pinchweld while preventing easy removal of the clip unless the clip mounting flanges 76 and 78 are first spread apart.

The clip body 52 is also provided with a pair of flanges 82 and 84 which are positioned intermediate the body end having aperture 62 formed therein and flanges 72, 74. A second pair of flanges 86 and 88 are similarly positioned between the end having aperture 60 formed therein and flanges 72, 74. Since each of the flanges in each flange pair are similar, only flange 84 will be described in detail. This flange is integrally formed from the body side 58 and extends downwardly and outwardly and then downwardly and inwardly a distance slightly greater than that of the flange 72 and 74 taken in a vertical direction. As illustrated in the drawing, flange 84 is bent outwardly and downwardly from side 58 to provide the section 92. The lower section 94 of the flange extends downwardly and inwardly and terminates in a slightly curved or flanged end 96. When the clip is installed on the pinchweld, end 96 will contact panel 20 to space the clip properly in relation to that panel. The portion of section 92 attached to body side section 58 is provided with a fillet 98 which aids in strengthening the clip body as well as providing additional strength for the flange 84.

When the molding 38 is installed over the clip 50, the molding flange 48 will engage the outer surface of flange section 94 and be held tightly against panel 20 by spring action of the flange 84. The horizontal distances between the points of engagement of molding flanges 46 and 48 with the clip flanges 82, 84 and 86, 88 are sufficiently greater than the distance between the inner edges of these molding flanges prior to the molding installation to provide a spring tension effect in each of the clip flanges engaged by the molding.

Due to the structural relationships of the clip mounting flanges 72, 74 and the molding retaining flanges 82, 84, 86, and 88, the clip may be placed over pinchwelds having various thicknesses which result in springing the flanges 72, 74 laterally without moving the molding retaining flanges. Similarly, moldings of various sizes may be accommodate without affecting the distance between inner portions of the mounting flanges.

The assembly is normally made by pushing the clip 50 downwardly over the pinchweld 28 so that the tabs 34 and 36 extend through their respective clip apertures 60 and 62. The tabs are then bent over the clip body 52 as illustrated to hold the clip in place. After the desired number of clips are installed on the pinchweld, the molding 38 is snapped in position and the assembly is completed. The molding retaining flanges are sufficiently spring-like in character to permit the molding to be snapped over them. The molding is then held tightly in place and completely covers the pinchweld as well as the clip to present a more attractive appearance and protect the pinchweld and clip from the elements and external damage.

When it is desirable for any reason to replace a molding, the original molding may be snapped off the clips. If at this time any clips need replacement, the tabs 34 and 36 may be straightened and the old clip removed. Since the tabs may be accidentally broken off during this operation, the clips are also provided with means permitting them to be secured to the pinchweld by separate fasteners. This separate method of attachment is considered to be primarily for service replacement rather than original installations, but if desired, may be used in the original assembly.

What is claimed is:

1. A clip for securing a flanged molding to a pinchweld, said clip comprising a clip body having a center section and two side sections integrally formed therewith and extending downwardly therefrom to provide an inverted channel-like cross section throughout the length of said clip, said body center section being undercut adjacent either end of said clip to form apertures defined by said center section and side sections extending through said body center section for receiving clip holding tabs formed on the pinchweld, a first pair of flanges integrally formed with and positioned centrally of said body and extending first downwardly and inwardly toward the vertically disposed longitudinal center plane of said body and then extending downwardly and outwardly therefrom and having substantially aligned apertures formed therethrough for receiving clip anchor means and at least one inwardly extending pinchweld-engageable barb on a flange thereof, and second and third pairs of flanges integrally formed with and longitudinally spaced along said body respectively intermediate said first pair of flanges and one of the ends of said clip, each flange of said second and third pair of flanges extending first outwardly and downwardly and then inwardly and downwardly relative to said body and bent to assume a hook conformation in cross section for springingly engaging and holding the flanged molding to the pinchweld.

2. The clip of claim 1, each flange of said second and third pair of flanges having a fillet intgerally formed therewith adjacent said clip body and extending to the adjacent end of said clip.

3. In combination a pinchweld molding securing assembly, at least two panels having complementary notched flanges joined to form a pinchweld having spaced notches therein, upwardly extending tabs integrally formed from portions of said pinchweld within said notches, a molding having an arched cross section and inwardly turned flanges formed adjacent either edge, and a clip received within one said pinchweld notches and securing said molding to said pinchweld whereby said clip and said pinchweld are covered by said molding in the assembled position, said clip comprising a clip body having open ended apertures formed therein and receiving said tabs, mounting flanges extending downwardly centrally of said body and receiving said pinchweld therebetween, and molding-engaged flanges extending first downwardly and outwardly and then downwardly and inwardly in relation to said body and springingly engaging said molding flanges and said panels whereby said molding is held in position over said pinchweld and on said panels, said tabs being bent over said clip body to retain said clip to said pinchweld.

4. The assembly of claim 3, said clip mounting flanges having substantially aligned apertures formed therethrough for receiving separate clip securing fastening means for fastening said clip to said pinchweld.

5. The assembly of claim 3, said mounting flanges being formed to include a pair of downwardly extending flange sections having pinchweld-engaging barbs formed therein and extending therefrom inwardly of said clip and gripping said pinchweld.

References Cited in the file of this patent

UNITED STATES PATENTS

| 1,451,043 | Le Compte | Apr. 10, 1923 |
| 2,216,219 | Wiley | Oct. 1, 1940 |
| 2,290,939 | Brown | July 28, 1942 |
| 2,318,840 | Del Camp | May 11, 1943 |
| 2,350,315 | Kral | May 30, 1944 |
| 2,539,956 | Klingensmith | Jan. 30, 1951 |
| 2,746,111 | Chvosta | May 22, 1956 |
| 2,837,184 | Fernberg | June 3, 1958 |

FOREIGN PATENTS

| 696,800 | Great Britain | Sept. 9, 1953 |